VARIABLE PHOTOSENSITIVE SEMICONDUCTOR DEVICE HAVING
A GRADUATINGLY DIFFERENT OPERABLE SURFACE AREA

Filed Nov. 28, 1962 2 Sheets-Sheet 1

INVENTORS
SHERMAN B. GROSS
CARL L. URETSKY
PHILIP T. ALTEBRANDC

BY James and Franklin
ATTORNEYS

VARIABLE PHOTOSENSITIVE SEMICONDUCTOR DEVICE HAVING A GRADUATINGLY DIFFERENT OPERABLE SURFACE AREA
Filed Nov. 28, 1962 2 Sheets-Sheet 2

INVENTORS
SHERMAN B. GROSS
CARL L. URETSKY
PHILIP T. ALTEBRANDO
BY James and Franklin
ATTORNEYS 3,296,502

VARIABLE PHOTOSENSITIVE SEMICONDUCTOR DEVICE HAVING A GRADUATINGLY DIFFERENT OPERABLE SURFACE AREA

Sherman B. Gross, North Woodmere, Carl L. Uretsky, Flushing, and Philip T. Altebrando, Selden, N.Y., assignors to General Instrument Corporation, Newark, N.J., a corporation of New Jersey Filed Nov. 28, 1962, Ser. No. 240,598
6 Claims. (Cl. 317—234)

The present invention relates to a semiconductor device the electrical characteristics of which are affected by light, and more specifically to such a device in which the degree to which the electrical characteristics are affected is dependent not only upon the amount of light impinging upon the device but also upon the place where the light impinges upon the device, the light-sensitivity of the device being different at different points on that surface thereof which is exposed to the light.

It is well known that certain semiconductor devices exhibit light sensitivity, that is to say, the rectifying characteristics thereof will vary depending upon the amount of light impinging upon the device. Such devices have been used as light-controlled valves or switches, controlling external circuits in accordance with the presence or absence of light impinging upon the devices or in accordance with the amount of light impinging thereupon. In many applications light sensitive control of external equipment is desired, but in accordance with the location of a light beam rather than the intensity of that beam. Prior art devices are capable of producing an on-off type of control, depending upon whether the light beam impinges upon the sensitive surface area of the device or not, but they are in general incapable of producing a gradual type of control or indication, depending upon the particular position of the light beam on the sensitive surface area of the device. Thus an "on-target" or "off-target" signal is produced by prior art devices, but not a signal which will gradually increase as the light beam approaches the center of the target and gradually decrease as the light beam moves away therefrom.

It is the prime object of the present invention to devise a semiconductor device which is light-sensitive, the light-sensitivity thereof differing at different points along its operative surface, thereby being capable of producing a signal which is dependent not only upon the magnitude of the light impinging upon the operative surface but also upon the particular place on that operative surface where the light impinges. A wide variety of different position-sensitivity relationships can be readily produced, so that devices corresponding to the present invention can be tailor-made to the specifications of a particular application.

These goals are accomplished by providing the photosensitive device of the present invention with an operative surface on which light is to impinge, the semiconductor body at that front surface being of a first semiconductor type. A second portion of the body, located generally inwardly from said operative surface and registering therewith, is of a second semiconductor type, a surface junction being defined between these two portions of the semiconductor body. The spacing between the surface junction and the operative surface registering therewith differs at different points on said operative surface, thus producing a different light sensitivity at those different points. The greater the spacing, the less is the light-sensitivity, and vice versa.

In a form preferred because of its relative ease of manufacture, the surface junction between the two body portions of different semiconductor types is substantially planar, and at least part of the operative surface in registration therewith is made concave, as by etching, the deep portions of the concave surface exhibiting a comparatively high degree of light-sensitivity and the shallow portions of the concave surface exhibiting a lesser degree of light sensitivity by virtue of the different spacing of those portions from the surface junction. When etching is employed the concavity is generally dish- or bowl-shaped, so that the light sensitivity varies gradually and regularly from the periphery to the center of the concave portion, thus producing a "gray" scale between the periphery and the center of the concave portion. The three-dimensional shape and projected areal extent of (a) the operative surface upon which light impinges, and (b) the surface junction formed within the body of the semiconductor device, and the degree to which they register with one another, can be widely varied to produce desired sensitivity characteristics. Further control of the position-sensitivity characteristic can be achieved by using appropriately shaped masks over the operative surface on which light is adapted to impinge. The devices of the present invention are therefore extremely flexible in design and hence capable of use in a wide variety of applications.

To the accomplishment of the above, and to such other objects as may hereinafter appear, the present invention relates to a semiconductor device the light-sensitivity of which is different at different points on the operative surface thereof, as defined in the appended claims and as described in this specification, taken together with the accompanying drawings, in which:

Figure 1:
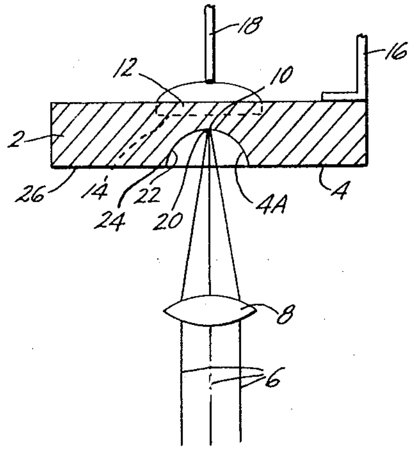
FIG. 1 is an idealized cross sectional view of a device of the present invention shown in use with a light beam impinging thereon.

The semiconductor device of the present invention is here specifically disclosed in the form of a diode having a body 2 the main portion of which is formed of semiconductor material of a given type which extends to the operative surface 4 thereof, upon which operative surface 4 light is adapted to impinge. In FIG. 1 that light is represented by the rays 6 which are focussed by lens 8 to a point 10. The body 2 includes a portion 12 which is of a different semiconductor type from the main portion of the body 2, a surface junction 14 being defined therebetween. Leads 16 and 18 are respectively electrically connected in any appropriate manner, as by soldering, to the main portion of the body 2 and to the portion 12 thereof which is of a different semiconductor type. By way of specific example, the body 2 may be formed of N-type germanium, while the portion 12 thereof is doped in any appropriate manner with suitable P-type impurities such as indium, indium-gallium or indium-aluminum. Alternatively the body 2 could be formed of N-type silicon, with the portion 12 doped with aluminum or boron. Other variations will suggest themselves to those skilled in the art. The portion 12 may be produced in any appropriate manner, as by diffusion, melting, alloying or the like, all as is well known in the semiconductor art. The present invention is not dependent upon the specific composition of the main portion of the body 2 or of the portion 12 thereof, provided that the substances employed produce a semi-conductive electrical control action (hereinafter generally termed a "rectifying" action) which is sensibly affected by light which impinges upon the operative surface 4. The photosensitive effect of devices of the type described has been recognized for some time.

In accordance with the present invention the operative surface 4 upon which light is to impinge, where it registers with the surface junction 14, and the surface junction 14 in registration therewith, are so cooperatingly shaped that the vertical distance therebetween varies at different points along the operative surface 4. The closer a given point on the operative surface 4 is to the surface junction 14, the greater is the sensitivity of the device to light impinging upon that point, and conversely, the greater the distance between a given point and the surface junction 14 the less is the light-sensitivity at that point.

Figure 2:
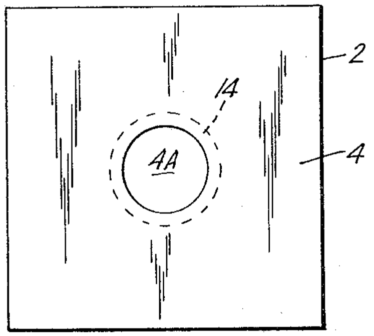
FIG. 2 is a bottom plan view of the semiconductor device of FIG. 1.
Figure 3:
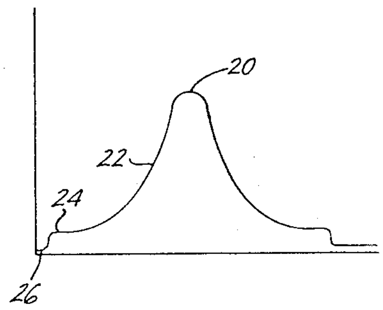
FIG. 3 is a typical graphical representation of the light-sensitivity of the device of FIG. 1 at different points along a line crossing its operative surface.

Such a non-uniform spatial relationship between points on the operative surface 4 and registering points on the surface junction 14 can be produced in a wide variety of ways. As disclosed in FIG. 1 the surface junction 14 is formed in conventional manner and is therefore substantially planar. A part 4A of the operative surface 4 which registers with the surface junction 14 is rendered concave, as by electrolytically etching away portions of the body 2 through a properly shaped resist mask, in accordance with known techniques. The result is that the rectifying action exerted between leads 16 and 18 will differ depending upon the presence or absence of light impinging upon the surface 4, in normal photosensitive manner, and in addition the rectifying action will depend upon the point on the surface 4 where light impinges. Thus when light impinges upon the very deepest point 20 of the surface 4A, which is closest to the surface junction 14, the light sensitivity of the device will be at its maximum and hence the greatest rectifying action will occur for a given light intensity. If the light beam should shift to the point 22, which is more remote from the surface junction 14, the light sensitivity of the device, and hence the rectifying effect, will decrease even though the light intensity remains the same. If the light beam should shift to a point 24 on the non-concave part of the surface 4, the light sensitivity, and hence the rectifying effect, will be still less. If the light beam shifts to a point 26 which is located laterally well outside the surface junction 14, no significant light-sensitive effect will occur. A graphical representation of the light sensitivity of the device of FIGS. 1 and 2 is shown in FIG. 3.

While the concave part 4A of the surface 4 is shown in FIG. 1 in the shape of a hemisphere, it will be apparent that many different shapes could be used, depending upon the desired relationship between light sensitivity and different points on the surface 4A.

Purely by way of example, the semiconductor body 2 may be defined by a wafer 5–6 mils thick, the surface junction 14 may be spaced from 2 to 2.5 mils down from the upper surface of the body 2, and the concave part 4A of the operative surface 4 may have a depth of 2–3 mils, the vertical distance between the surface junction 14 and registering points on the concave surface 4A varying between 0.5 and 2.8 mils.

While minimization of the distance between the surface junction 14 and the operative surface 4 increases light sensitivity, a decrease of that spacing below a certain value which will differ for different materials will produce noise problems, so that ordinarily for a given device there is a minimum distance representing the closest that the two surfaces in question should be spaced from one another.

Figure 4:
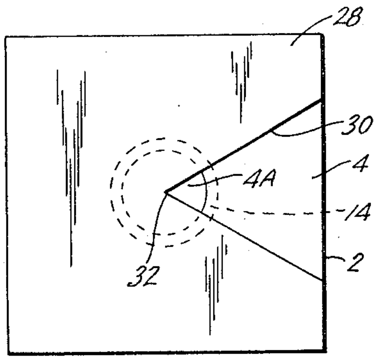
FIG. 4 is a view similar to FIG. 2 but showing a mask applied to the operative surface of the device and masking a portion thereof.

In the device of FIG. 1 as the light beam 6 moves from left to right across the surface 4A the light sensitivity will gradually increase and then gradually decrease, as shown in FIG. 3. This characteristic can be modified by changing the shape of the concave surface 4A, as has been explained, but a more convenient way of modifying the light sensitivity characteristic is through the use of a mask 28, as shown in FIG. 4, that figure disclosing the mask 28 applied over the operative surface 4 of the device of FIG. 1. The mask 28 is opaque but has a triangular opening 30 the vertex 32 of which registers with the center of the concave surface 4A. With the device of FIG. 4, as a light beam moves from right to left across the center of the device, the sensitivity will follow the curve of FIG. 3 from the right hand side up to the point 20, and then will abruptly drop to zero. In addition, any departure of the light beam from the center of the device will cause the light sensitivity-position characteristic to change sharply from a discrete value to zero as the light beam passes from the opening 30 to the opaque portion of the mask 28.

Figure 5:
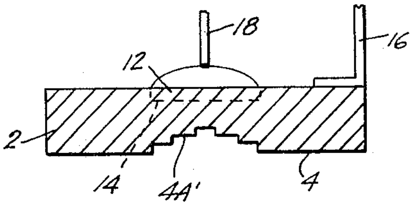
FIG. 5 is a schematic cross sectional view similar to FIG. 1 but illustrating an alternative embodiment.

While etching is a most convenient method for the formation of the concave surface 4A, and while normal etching techniques will give rise to a smoothly dished concave portion 4A, other means of removing the material of the body 2 to form the concave portion 4A could be employed, i.e., abrading. Moreover, through suitable techniques, non-uniform concave portions could be formed, such as the stepped portion 4A′ of FIG. 5. That particular configuration would give rise to a sensitivity-position characteristic of approximately the same shape as its physical configuration.

Figure 6:
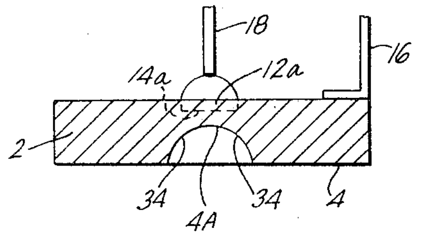
FIG. 6 is a schematic cross sectional view of yet another embodiment.
Figure 7:
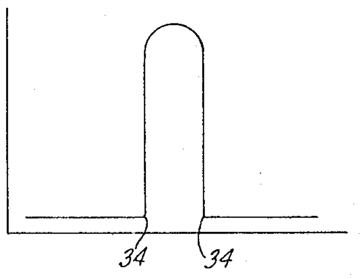
FIG. 7 is a graphical representation, similar to FIG. 3, but showing typical characteristics of the device of FIG. 6.

In the embodiment of FIG. 1 the areal extent of the surface junction 12 was somewhat greater than that of the concave surface 4A, thus giving rise to a minimal degree of light sensitivity at point 24. In FIG. 6 the surface junction 14*a* is smaller in areal extent than the concave surface 4A. The device will not have any appreciable light sensitivity until the light beam impinges upon a point on the surface 4 approximately opposite the surface junction 14*a*, those points being designated 34 in FIG. 6. Thus the light characteristic of the device of FIG. 6 will be approximately that disclosed in FIG. 7, with sharp changes at the points 34.

Figure 10:
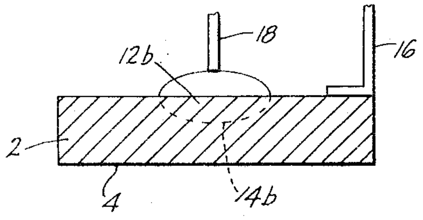
FIG. 10 is a schematic cross sectional view of yet another embodiment.

The relative spacing between the operative surface 4 and the surface junction 14 can be caused to vary over portions of the surface 4 by varying the shape of the surface junction 14 rather than the shape of the surface 4. Thus, as shown in FIG. 10, the body portion 12*b* of second semiconductor type can, through suitable control of the alloying or diffusion step, be caused to assume a bulbous rather than a flat shape, so that the surface junction 14*b* curves down toward the surface 4. The light sensitivity-position characteristic of the device of FIG. 8 will be comparable to that shown in FIG. 3.

Figure 9:
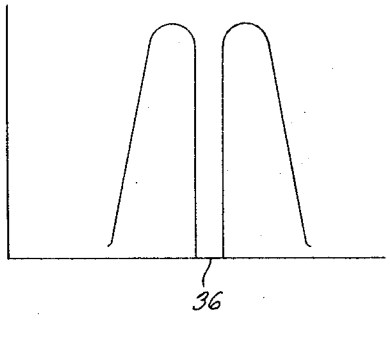
FIG. 9 is a graphical representation, similar to FIG. 3, but showing typical characteristics of the device of FIG. 8.
Figure 8:
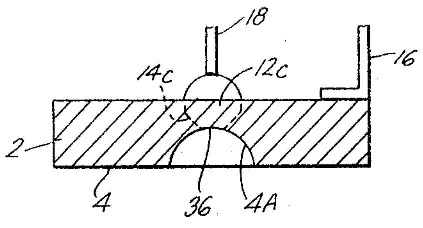
FIG. 8 is a schematic cross sectional view of yet another embodiment.

A "dead spot"—an area without light sensitivity—can be produced at a location wholly or partially surrounded by light-sensitive points, without the use of a mask. Thus, as shown in FIG. 8, the portion 12*c* of second semiconductor type is caused to take a shape such that a portion 36 thereof extends all the way to the surface 4, the surface junction 14*c* being curved to extend gradually to the portion 36. Where the body portion 12*c* is exposed at the surface 4 there is no light sensitivity, and consequently the relationship between light sensitivity and position in the device of FIG. 9 will be approximately of the type shown in FIG. 9.

While the present invention has been here specifically disclosed in the form of a two-part diode, this is purely by way of exemplification, and other more complex semiconductor devices could be used provided that a rectifying surface junction thereof is in light-sensitive relation to a surface thereof in the manner above described.

It will be appreciated from the above that the device of the present invention can be very easily manufactured to a wide variety of specifications, and consequently may be used to provide many different types of control, all characterized by sensitivity not only to the intensity of light impinging thereon but also to the location thereon of the impinging light.

While but a limited number of embodiments of the present invention have been here specifically disclosed, it will be apparent that many variations may be made therein, all within the scope of the invention as defined in the following claims.

We claim:

1. In a photosensitive device comprising a semiconductor body having a surface, a first portion of said body extending away from said surface and being of a first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said different sections of said operative area within said photosensitive section being spaced from sections of said area junction thereopposite by different distances within the limits of photosensitivity, said second body portion extending completely to said operative area over a fraction only of said area, thereby to render said fraction of said operative area non-photosensitive while leaving the remainder of said operative area photosensitive.

2. In a photosensitive device comprising a semiconductor body having a surface, a first portion of said body extending away from said surface and being of a first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said different sections of said operative area within said photosensitive section being spaced from sections of said area junction thereopposite by different distances within the limits of photosensitivity, and a light mask over said operative area and having an opening therethrough exposing only a fraction of said area.

3. In a photosensitive device comprising a semiconductor body having a surface, a first portion of said body extending away from said surface and being of first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said part of said surface defining said operative surface area being concave, said area junction where it is opposite said operative surface area having a different contour from said operative surface area, whereby said different sections of said operative area within said photosensitive section are spaced from sections of said area junction thereopposite by different distances within the limits of photosensitivity, said second body portion extending completely to said operative area over a fraction only of said area, thereto to render said fraction of said operative area non-photosensitive while leaving the remainder of said operative area photosensitive.

4. In a photosensitive device comprising a semiconductor body having a surface, a first portion of said body extending away from said surface and being of a first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said part of said surface defining said operative surface area being concave, said area junction where it is opposite said operative surface area having a different contour from said operative surface area, whereby said different sections of said operative area within said photosensitive section are spaced from sections of said area junction thereopposite by different distances within the limits of photosensitivity, and a light mask over said operative area and having an opening therethrough exposing only a fraction of said area.

5. In a photosensitive device comprising a semiconductor body having a surface, a first portion of said body extending away from said surface and being of a first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said part of said surface defining said operative surface area being concave, said area junction where it is opposite said operative surface area being substantially planar, whereby said different sections of said operative area within said photosensitive section are spaced from sections of said area junction thereopposite by different distances within the limits of photosensitivity, said second body portion extending completely to said operative area over a fraction only of said area, thereto to render said fraction of said operative area non-photosensitive while leaving the remainder of said operative area photosensitive.

6. In a photosensitive device comprising a semiconductor body having a surface, a first portion of said body extending away from said surface and being of a first semiconductor type, a second portion of said body being generally spaced from said surface by said first portion and being of a second semiconductor type, an area junction being defined between said first and second body portions, the spacing between a part of said surface and at least a part of said area junction being within the limits of photosensitivity, thereby to define a photosensitive section, said part of said surface defining an operative surface area on which light is adapted to impinge, thereby to vary the electrical characteristics of said device; the improvement which comprises said operative surface area being of appreciable extent such that light can be selectively directed to different sections thereof, and means for rendering the photoelectric sensitivity of said device graduatingly different at said different sections of said operative surface area, said means comprising said part of said surface defining said operative surface area being concave, said area junction where it is opposite said operative surface area being substantially planar, whereby said different sections of said operative area within said photosensitive section are spaced from sections of said area junction thereopposite by different distances within the limits of photosensitivity, and a light mask over said operative area and having an opening therethrough exposing only a fraction of said area.

References Cited by the Examiner

UNITFD STATES PATENTS

| | | | |
|---|---|---|---|
| 2,644,852 | 7/1953 | Dunlap | 317—235 |
| 3,170,067 | 2/1965 | Kibler | 317—234 |
| 3,210,622 | 10/1965 | Gradus | 317—235 |

JOHN W. HUCKERT, *Primary Examiner.*

R. F. POLISSACK, J. D. KALLAM, *Assistant Examiners.*